United States Patent [19]

Maxemchuk

[11] Patent Number: 4,797,882
[45] Date of Patent: Jan. 10, 1989

[54] MESH-BASED SWITCHING NETWORK

[75] Inventor: Nicholas F. Maxemchuk, Mountainside, N.J.

[73] Assignee: American Telephone and Telegraph Company, AT&T Bell Laboratories, Murray Hill, N.J.

[21] Appl. No.: 782,969

[22] Filed: Oct. 2, 1985

[51] Int. Cl.⁴ .............................................. H04J 3/24
[52] U.S. Cl. ........................................ 370/94; 370/60; 370/88
[58] Field of Search ..................... 370/94, 60, 88, 54

[56] References Cited

U.S. PATENT DOCUMENTS

| | | | |
|---|---|---|---|
| 3,794,983 | 2/1974 | Sahin | 370/54 |
| 4,314,367 | 2/1982 | Bakka et al. | 370/94 |
| 4,334,306 | 6/1982 | Ulug | 370/94 |
| 4,380,063 | 4/1983 | Janson et al. | 370/60 |
| 4,672,373 | 6/1987 | Mori et al. | 370/94 |
| 4,736,465 | 4/1988 | Bobey et al. | 370/88 |
| 4,742,511 | 5/1988 | Johnson | 370/94 |

*Primary Examiner*—Douglas W. Olms
*Assistant Examiner*—Wellington Chin
*Attorney, Agent, or Firm*—Henry T. Brendzel

[57] ABSTRACT

A grid-based mesh network with even numbers of alternatingly directed rows and columns. Devices are attached by way of nodes which exist at the intersections of rows and columns. The extremes of the grid are connected to form a three-dimensional network on the surface of a sphere. The strategy at each node requires that every packet arriving on an incoming link must leave on an outgoing link, so there is no need for any packet buffering in the node. Described herein are several routing algorithms, an alternative to sequential addressing, a method for adding nodes to the network, ways to deal with failed nodes and links, a hierarchically structured network, and a scheme for efficiently transferring files of more than one packet.

15 Claims, 8 Drawing Sheets

MESH-BASED SWITCHING NETWORK

FIELD OF THE INVENTION

This invention relates to the field of local area networks (LANs). More particularly, this invention relates to an improved LAN with a mesh topology based on alternatingly directed paths.

BACKGROUND OF THE INVENTION

A local area network (LAN) is a data-communications network which is generally thought of as being limited to a relatively small geographical area. Because of this geographic concentration, LANs differ from long-distance networks in a number of respects. For example, there exists more freedom in determining the topology of a LAN because nodes do not necessarily have to be connected to their closest neighbors if doing so makes routing more complicated. Error rates tend to be lower in LANs than in long-distance networks. Consequently, error checking can be done on an end to end, rather than a link by link, basis. Also a LAN can utilize less expensive communications lines.

The evolution of personal computers and the more widespread use of computers in general have given rise to a need for LANs with higher throughput and reliability than those developed a decade or more ago. The complexity of the devices being connected to networks and advances in VLSI make more complex network interfaces feasible, thus increasing the number of network structures and access strategies that can be considered.

The star, ring, bus, and tree topologies are four standard LAN structures currently being used. The star topology consists of a central switch, or hub, with links connecting the hub to each of the devices. A packet transmitted from any device must pass through the hub to its destination. The hub, therefore, is the central controller of the system. A ring, or loop, topology comprises a series of unidirectional links connecting Ring Interface Units which are in turn connected to devices. A bus topology is a long transmission channel to which all of the devices are attached through Bus Interface Units. The devices contend for access to the bus and the choice of a winner must be based on a priorily specified rules. Lastly, a tree structure comprises links interconnected like branches on a tree. In this structure, a packet travels from its originating node to the root, or head end, of the tree and is then retransmitted down the tree to its destination.

These topologies have several disadvantages. With buses and rings, the fraction of the network used to transmit each packet is very high. Consequently, very few messages, or in some cases just one, can be transmitted at a time. The star topology provides an improvement in this respect. A smaller fraction of the network is used for each transmission, but all transmitted packets must pass through the central hub. The central controller, hence, is the bottleneck which limits the number of packets that can be transmitted simultaneously. A similar situation exists with the tree topology.

Another alternative is a new tree topology being investigated by Yemini in "Tinkernet: Or Is There Life Between LANs and PBXs," Proc. ICC 1983, Vol. 3, (Boston, June, 1984), pp. 1501-5, and a variation thereof by Saadawi and Schwartz in "Distributed Switching for Data Transmission Over Two-Way CATV," Proc. ICC 1984, (Amsterdam, May, 1984), pp. 1409-13. In these networks, the nodes are switching points, eliminating the need for every packet to pass through the head end. Although this approach utilizes a smaller fraction of the network for each message and requires only one type of element, it must either store and forward packets (Saadawi) or retain the distance constraints of broadcast networks (Yemini).

To a certain extent these alternatives remove the throughput constraints of ring and bus systems. However, they still have single points of failure. To increase the network's reliability, or the number of links or nodes that can fail without a substantial loss in efficiency, there must be multiple paths between each source and destination. By increasing the number of paths properly, the average and maximum distances between nodes decrease, messages use of smaller fraction of the network, and the throughput increases. Multiple paths also make it possible to avoid heavily used segments of the network to equalize the load.

Another attempt at a solution is the bidirectional loop. It consists of a plurality of nodes connected in a circle by bidirectional paths. This network is defined for any number of nodes and makes geographical sense. It also has simple expanding and routing rules although these two functions complicate each other. The routing rule depends on the sequential addressing of the nodes, but these addresses change when the network is expanded. Consequently, either a routing rule which does not depend on the node addresses must be adopted or a new set of addresses must be distributed each time the network is changed. Moreover, there exist only two different paths between any two nodes.

Another, more effctive, attempt at a solution is set forth by Pierce in "How Far Can Loops Go," IEEE Trans. on Comm., Vol. M-20, No. 3, June, 1972, pp. 527-530. His topology consists of a plurality of loops interconnected by switching elements. Messages use a smaller fraction of the total network than they would if the system were a single loop, thereby increasing the maximum throughput. Interference between subgroups of users is minimized by placing user who communicate primarily with each other on the same loop. The main disadvantage with this approach is that it requires two different types of elements—those for switching and those for access to devices. Also, the swtiching elements must have complex store and forward capabilities.

A general class of LAN topologies which provide for multiple paths between nodes and overcome many of the disadvantages of the multiple loop and tree systems described above are mesh LANs. Mesh LANs have no central node and consist of point to point communication channels between nodes, thus requiring less expensive line drivers and receivers. In addition, their structure makes numerous long connections unnecessary and can take advantage of the natural formation of communities of interest, or groups of nodes who communicate primarily with each other. It is comparatively easy to add nodes to a mesh LAN and these networks are very adaptable to new fiber optics technology.

One implementation of a mesh LAN, called FLOODNET, is described by Petitpierre in "Meshed Local Computer Networks, IEEE Comm. Mag., Vol. 22, No. 8, (August, 1984), pp. 36-40. In FLOODNET, when a packet comes into a node, it is retransmitted on all lines emanating from the node except the one on which the packet arrived. A routine for eliminating extraneous packets must be implemented. Each packet then "floods" the entire network.

The modified shuffle exchange network is another network characterized by a mesh topology. It is defined for N nodes where N is strictly a power of 2. Each node i is connected to nodes 2i mod N and (2i+1) mod N. Although the throughput of this system is higher than that of the bidirectional loop, it does not make geographical sense and can only be used feasibly in a small area. Since N is constrained to be a power of 2, there is no known way to add one node at a time. The network provides alternate paths between nodes, but they are much longer than the primary paths.

It is an object of this invention to provide an improved topology for a local area network.

It is a further object of the invention to increase the throughput and reliability of a local area network through an improved topology.

It is another object of the invention to provide a local area network topology with simple enlarging and routing schemes.

It is yet another object of the invention to provide a local area network topology which requires only one kind of connection, and is adaptable to a hierarchical structure.

SUMMARY OF THE INVENTION

The network described herein is a grid-based mesh network consisting of even numbers of alternatingly directed paths. Devices are attached to the network by way of nodes which exist at the intersections of, and connect to, the paths. Thus, apart from the interconnection through which each device is attached to a node, each node has two incoming links and two outgoing links. The extremes of the paths are connected and, thus, the paths may be viewed as intersecting row loops and column loops. The set of intersecting row loops and column loops may be thought of being formed on the surface of a torus rather than a plane. In accordance with this invention, a packet arriving at an incoming link and not destined for the device attached to the node is switched to one of the outgoing links; hence no packet buffering is required within a node. The structure of the network permits many different paths to be taken between any two nodes and, therefore, the FIG. 1 network possesses many advantages.

DETAILED DESCRIPTION

Figure 1:
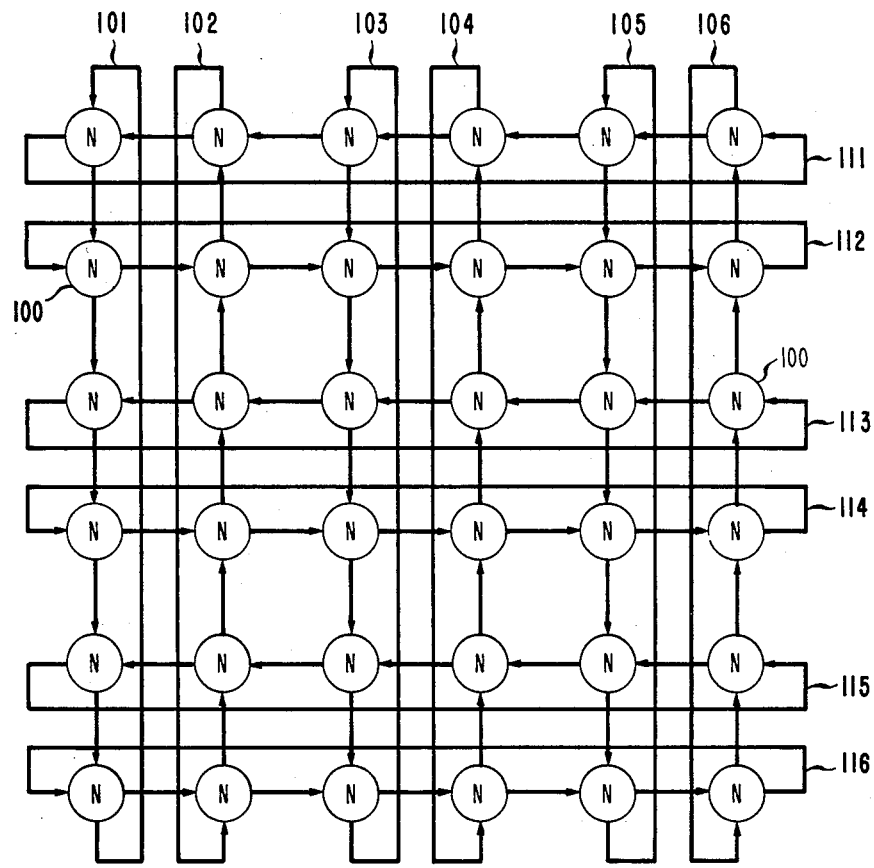
FIG. 1 depicts the general interconnection structure of the network of this invention.

FIG. 1 shows the general structure of an elemental network in accordance with the principles of my invention. This structure is based on a common traffic layout for some cities which consists of two sets of roads, with the roads in each set being parallel to each other and perpendicular to the roads of the other set. This arrangement forms a grid. In particular, the FIG. 1 topology is similar to the arrangement of streets in Manhattan where adjacent streets (and avenues) are one way, and oppositely directed. This topology is different from the arrangement of city streets, however, in that the two extremes of each path are connected, and each path thereby forms a loop.

Referring to FIG. 1, the set of lines numbered 101-106 and the set of lines numbered 111-116 correspond to the two sets of paths described above. Paths 101-106 form a set of row loops and paths 111-116 form a set of column loops. The nodes, shown as circles 100 in FIG. 1, exist at the intersections of the row and column loops. The combination of row and column loops with adjacent row and column loops being oppositely directed implies an even number of row loops and column loops. The network can be mapped onto a torus which can be rotated about its two axes to place any point in front of the viewer, so can the network of FIG. 1 be conceptually rotated to place any node at the conceptual center. This rotation greatly simplifies routing algorithm, as is described in greater detail hereinafter.

A network with m column loops (numbered from 0 to m−1) and n row loops (numbered from 0 to n−1) is said to be an m x n network. A node (I,J) is interconnected with nodes (I+1,J), (I−1,J), (I,J+1), and (I,J−1), where I is the column address, J is the row address. The above additions/subtractions on I are performed in modulo m and the additions/subtractions on J are performed in modulo n. The I,J pair is considered the absolute address of a node.

Each of the nodes in the network serves as an interface between the network and a device connected at that node (e.g., printer, PC, terminal, file server, main computer, etc.). It should be noted that devices attached to the network (and their corresponding nodes) need not be in any particular geographic arrangement. Devices which are closest together do not even necessarily have to be directly connected if it makes more sense (e.g., for routing) not to do so. The switching strategy insures that each incoming packet not destined for the node is routed to one of the outgoing links. This requirement sometimes leads to longer paths, but a routing algorithm can easily be employed which insures that a packet forced to take a less desirable path at one node will, in the worst case, have to travel around a square and, in that event, the resulting path length to the destination will be increased by four. Actually, in most cases the path length is not increased at all because, in passing through an intermediate node on the way to a specific destination node, it is not always important to select a specific outgoing node. For example, one can move two nodes north and then two nodes east, or vice-versa, and reach the same node.

Figure 2:
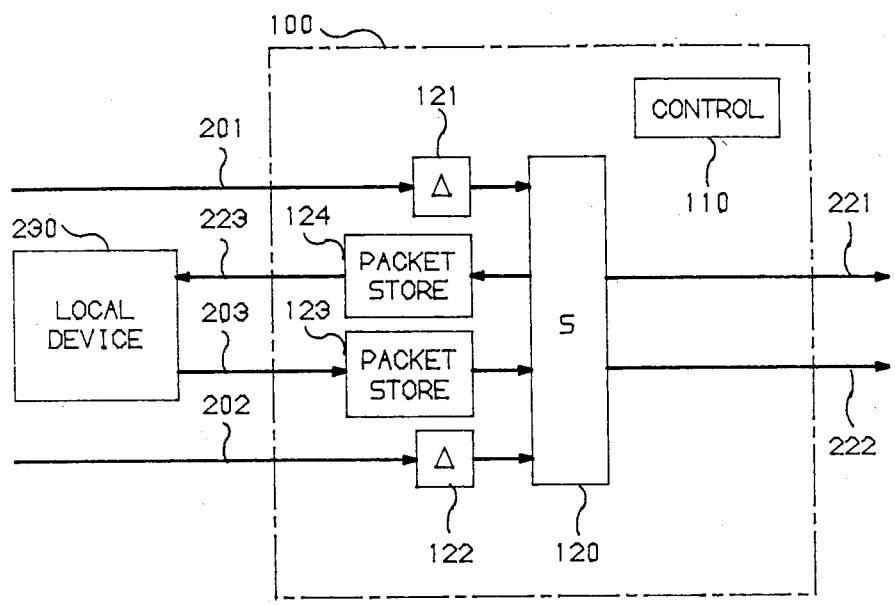
FIG. 2 presents the block diagram of one embodiment for nodes 100 in FIG. 1.

FIG. 2 illustrates one structure for nodes 100. In FIG. 2, node 100 receives signal packets on input links 201 and 202, and transmits packets on output links 221 and 222. Links 201 and 221 belong to a row loop and links 202 and 222 belong to a column loop (the row/column selection is, of course, arbitrary). Packets are also communicated between node 100 and a local device 230 via incoming link 203 and outgoing link 223. Within node 100, there is a switch 120 to which all the links are connected, although the connection is not necessarily direct. Links 201 and 202 are connected to switch 120 via delay elements 121 and 122, respectively, and links 203 and 223 are converted to switch 120 via packet stores 123 and 124, and links 203 and 223 are converted to switch 120 via packet stores 123 and 124, respectively. In addition, node 100 contains control block 110 which oversees the operation of switch 120. Node 100 is cognizant of its own absolute address (I,J) and operates with its own independent clock.

The node structure of FIG. 2 employs a communications approach known as a slotted system. Packets of data are constrained to a specific number of bits that can be transmitted in a corresponding time period, and that time period is called a slot. Each packet comprises a header field that contains certain information relating to the packet, such as the destination address of the packet, a data field that contains the information sought to be transmitted, and a small margin field that effectively permits variations in the communication frequencies of the different nodes 100 without loss of information. Node 100, under control of block 110, continuously transmits bits on each of its outgoing links and periodically transmits a start of slot indication. Packets are routed out of a node immediately following a start of slot indication. Delay elements 121 and 122 are included in the FIG. 2 node structure to compensate for variations in the arrival time of packets on inputs 201 and 202. Packet stores 123 and 124 are included to compensate for the different transmission modes of device 230 and node 100.

Packets from local device 230 are transmitted by the node only when one of the outgoing links is not being used by an incoming packet. When both outgoing links are busy, the source is throttled. The throttling is done at the device itself so that, other than the delay provided by element 123, no additional buffering is required. If the network delivers packets faster than local device 230 can accept them, the packets are routed to one of the outgoing links and in due time they come back and try to access the local device again.

Figure 3:
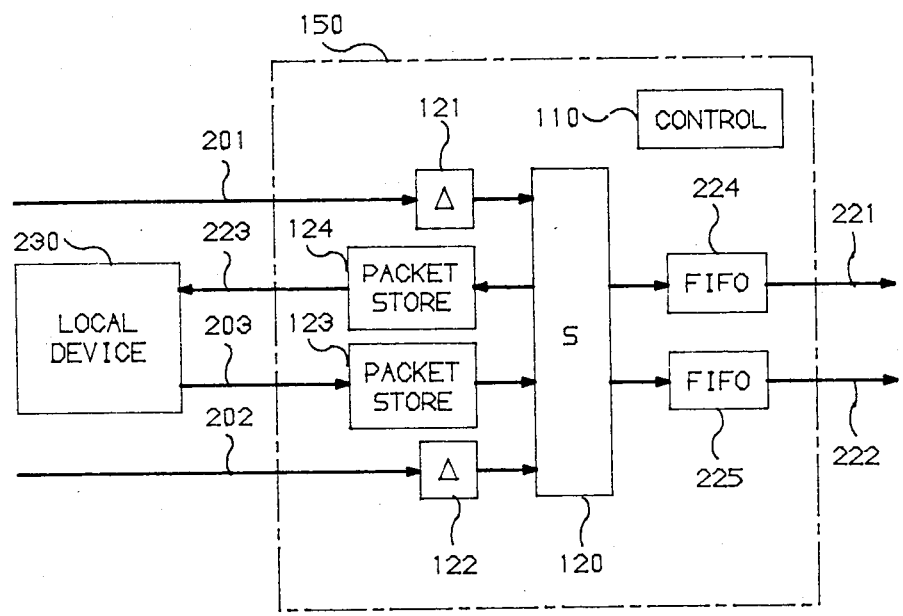
FIG. 3 presents a different embodiment for nodes 100 of FIG. 1.

FIG. 3 depicts a modified node 100, identified as node 150, which is identical to node 100 of FIG. 2 in all respects except that outgoing links 221 and 222 have FIFO output buffer elements 224 and 225, respectively. Buffer elements 224 and 225 may contain a small number of fixed size packet buffers, thereby reducing the probability that a packet must take a less desirabe path. Of course, in the long run the numbers of packets wishing to exit through the two outgoing links must be the same in order for buffers 224 and 225 to empty out.

One important advantage of the FIG. 1 network is the simple routing algorithm that may be employed. Each node has its own absolute address, of which it is aware, and all routing performed by a node is tied to the destination address of an incoming packet relative to its own address. That is, when a packet arrives into a node 100, the address of the packet's destination is identified, and a relative address (i,j) is computed for the node where the packet arrives that is relative to the destination address. The destination node is thereby assumed to possess the relative address (0,0) and is considered by the node where the packet arrives as being in the center of the network.

The translation of absolute address values I and J which presumably run from 0 to m−1 and 0 to n−1, respectivly, to relative address values i and j ranging from −(m/2−1) to m/2 and from −(n/2−1) to n/2, respectively, is performed in accordance with the following equations:

$$i = \{[1-2(J_s \bmod 2)](I_d - I_s) + 2 - 1)\} \bmod m - (m/2 - 1)$$

$$j = \{[1-2(I_s \bmod 2)](J_d - J_s) + 2 - 1)\} \bmod n - (n/2 - 1)$$

where $I_d$ and $J_d$ pair comprise the absolute address of the destination node and $I_s$ and $J_s$ pair comprise the absolute address of the source node. The "source node" is the node which must transmit a packet; be it one received on an incoming node or one received from the device associated with the node.

It may be noted that the term $1-2(J_s \text{ modulo } 2)$ takes on the value $-1$ when J is odd and $+1$ when J is even. This accounts for the unidirectional nature of the paths while presupposing the following:
(a) that the node with absolute address (0,0) has outgoing paths to the node with absolute address (0,1) and to the node with absolute address (1,0),
(b) that the relative addresses if FIG. 1 increase to the right and upwards, and
(c) that the network is reflected about the i=0 and the j=0 axes, as necessary, to cause the signal flow into the destination node to be from the node having the address (i=0,j=1) and from the node having the address (i=1,j=0).

Figure 4:
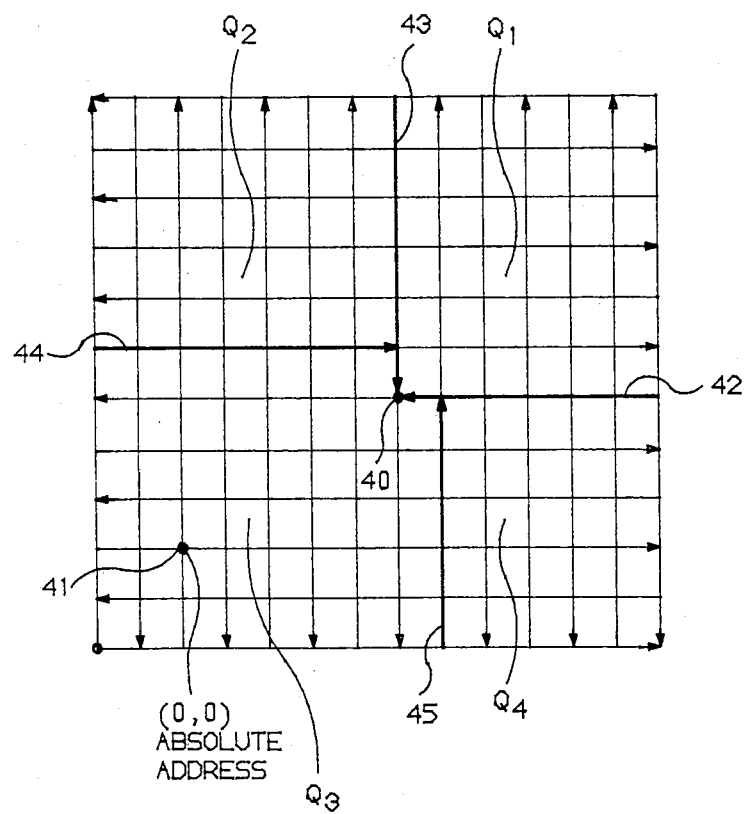
FIG. 4 illustrates the quadrants and primary paths established in accordance with the routing algorithm for the FIG. 1 network.

FIG. 4 shows the FIG. 1 network as it is viewed by the routing rules. For sake of simplicity, the connection between the nodes at the extremities of the FIG. 4 network are not shown, although it should be kept in mind that they exist. Node 40 is shown as the destination node, while node 41 in the left lower quadrant of the network is shown as the node with the absolute address (0,0). At node 41 the column links point upward and the row links point to the right. The destination node, having the relative address (0,0), is conceptually at the center of the network and is so drawn in the FIG. 4 network. It happens to have an odd absolute column address and an odd absolute row address.

Because of the reflections about the i and j axes which are implemented by the translation equations (to follow the odd/even status of the destination node) there is always a primary path leading to the right of node 40 along the row j=0 and above node 40 along the column i=0. These paths are depicted in FIG. 4 by line segments 42 and 43. Since the primary paths of segments 42 and 43 cover only flow to the left and downwards, respectively, a second set of primary paths is developed to cover upward flow and flow to the right. The upward primary path must reach preferred segment 42, and therefore it is set at i=1. The flow to the right must reach preferred segment 43, and therefore it is set at j=1. This second set of primary paths is illustrated in FIG. 4 by line segments 44 and 45.

Line segments 42–45 divide the network of FIG. 4 into four roughly equal quadrants $Q_1$, $Q_2$, $Q_3$, and $Q_4$. The preferred flow in each quadrant is toward the destination node generally, and specifically toward the primary paths. It is always in the same direction. However, the above described reflections are subject to the odd/even status of the destination node's absolute address, and the direction of flow through the source node depends on the odd/even status of its absolute address. Hence, the preferred outgoing link for each packet in a source node is determined in accordance with a combination of the odd/even status of the two addresses.

Specifically, an Exclussive OR of the two addresses yields a concise control signal.

In accordance with the routing preferences described above, Table 1 presents the routing preferences in the different locations as determined by the source node's relative address (quadrant) and as a function of the Exclusive OR between the odd (1)/even (0) status of its absolute address and that of the destination address.

TABLE 1

| Location | $I_s$ Ex OR $I_d$ | $I_s$ Ex OR $I_d$ | preference |
|---|---|---|---|
| 42 | | | outgoing row |
| 44 | | | outgoing column |
| 45 | | | outgoing row |
| 43 | | | outgoing column |
| $Q_1$ | 0 | 0 | outgoing row or column |
| | 0 | 1 | outgoing column |
| | 1 | 0 | outgoing row |
| | 1 | 1 | outgoing row or column * |
| $Q_2$ | 0 | 0 | outgoing column |
| | 0 | 1 | outgoing row or column |
| | 1 | 0 | outgoing row or column * |
| | 1 | 1 | outgoing row |
| $Q_3$ | 0 | 0 | outgoing row or column * |
| | 0 | 1 | outgoing row |
| | 1 | 0 | outgoing column |
| | 1 | 1 | outgoing row or column |
| $Q_4$ | 0 | 0 | outgoing row |
| | 0 | 1 | outgoing row or column |
| | 1 | 0 | outgoing row or column * |
| | 1 | 1 | outgoing column |

*Neither path is preferred

The following step-by-step description summarizes the above-described procedure.

Step 1. A determintion is made as to whether there are two incoming infomation packets or just one. If only one information packet enters the node, local device 230 is considerd to determine whether it wishes to transmit a packet.

The consequence of step 1 is that either one or two packets are considered for routing to the node's row and column outgoing links. When only one packet needs to be considered, its routing preference is granted in accordance with steps 2 through 4 below. When two packets need to be considered, however, their preferences are tempered by step 5 which resolves conflicts between the packet preferences.

Step 2. The absolute address of the destination node is extracted from each packet to be routed, and a determination is made as to whether the row and column addresses are even or odd.

Step 3. The relative address of the source node is computed and a determination is made as to whether the source node is at any of the segments 42, 43, 44, or 45, or in quadrant $Q_1$, $Q_2$, $Q_3$, or $Q_4$.

Step 4. Employing the knowledge about the odd-/even status of the source node's absolute address and the results of steps 2 and 3, the routing preference for the packet is determined in accordance with Table 1.

Step 5. Conflicts arise only when both outgoing packets want a specific outgoing link. On the average, this should occur only ⅛ of the time but, when it does, the conflict must be resolved. One useful approach for resolving conflicts is to include information in the header field of the packet concerning the number of times that packet was denied its preferred routing. The packet with the higher number gets its preference granted, but when the two numbers are equal, a packet is randomly picked.

Figure 5:
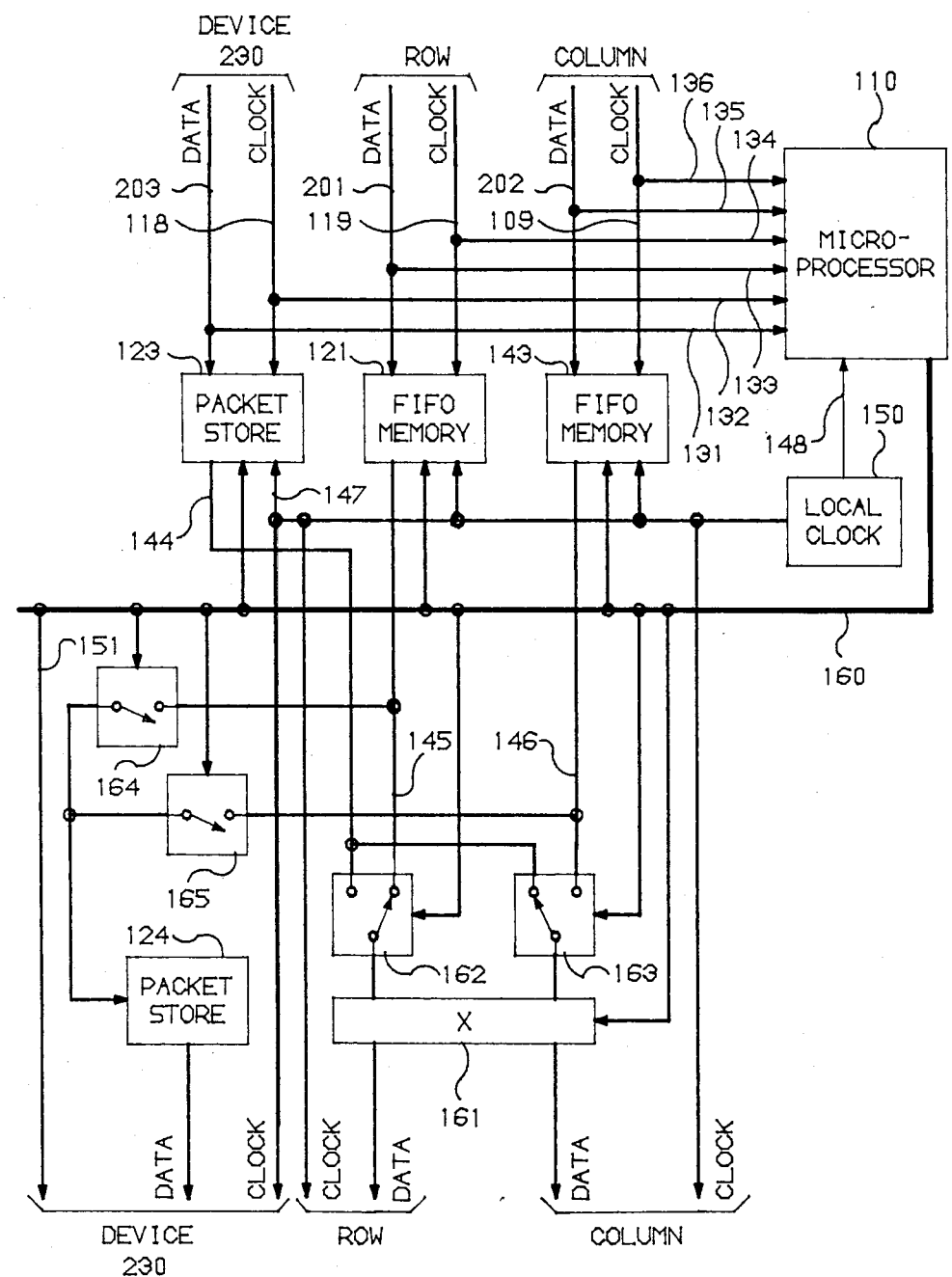
FIG. 5 presents a more detailed block diagram of a node 100.

FIG. 5 presents a more detailed diagram of node 100, describing with greater particularity the structure of switch 120 and the communications between control 110 and the other elements within the node. With reference to FIG. 5, device 230 sends packets to 123 via data line 203 and clock line 118. The incoming row link sends packets to FIFO (first-in-first-out) memory 121 via data line 201 and clock line 119, and the incoming column link sends packets to FIFO memory 122 via data line 202 and clock line 109. Memories 121 and 122 are conventional FIFO memories that permit the storage of data at one port, employing an input clock signal, and the reading of data on a first-in-first-out basis at another port, employing an output clock signal. In FIG. 5, memories 121 and 122 and packet store 123 provide a signal output on leads 144 146, response to a common clock signal on line 147. The clock signal of line 147 emanates from clock circuit 150 which is local to the node.

The data and clock signals applied to elements 121–123 are also applied to control element 110, which is shown to be a microprocessor. Microprocessor 110, which receives a local clock 150 signal via line 148, may be a conventional device that performs the arithmetic operations specified by the above-described routing rules. It determines when packets begin to arrive (detects a start of slot bit pattern), ascertains the destination address of packets and assesses the priority level of incoming packet (based on the number of times the packet has been denied its preferred route, and/or based on other priority considerations). It controls the operations of node 100 in accordance with the above-described routing algorithm via bus 160. The switching itself is quite simple. Incoming packets are either switched to an outgoing row or an outgoing column by switch 161. When one of the incoming packets is missing, it can be replaced with a packet from packet store 123 by switches 162 and 163. When an incoming packet seeks to be sent to device 230, it is routed to packet store 124 via switches 164 and 165.

Since my invention contemplates each node to be operating with its own independent clock, there is always a potential for "phase skew" between incoming links. That is, the start time of packets entering an incoming row link is likely to be different from the start time of packets entering the incoming column link. This is resolved by microprocessor 110 as follows. At a preselectd instant before the start of slot by local clock 150, line 148 initiates a query by microprocessor 110 of its internal registers that inform the microprocessor of packet arrivals at the inputs of node 100. When only one packet is known to have arrived (and partially stored in its respective FIFO memory), that packet is routed to its preferred outgoing link. When a packet is known to have arrived on either the row or the column links (but not on both), and a packet has arrived from device 230, then the two available packets are routed in accordance with the above-described routing algorithm. When both the row and the column incoming links have arriving packets, the packets are routed as above and device 230 is throttled via line 151, which is part of bus 160. Of course, the line 148 signal that initiates this process needs to precede the start of slot of clock 150 only by an amount sufficient to read the information provided by the arriving packets and make the necessray routing decisions.

In the addressing scheme described above, row loops and column loops are numbered from 0 to m and 0 to n (absolute addresses). In an alternate addressing scheme, modulo 2 fractional addressing may be employed to an advantage. This addressing scheme may usefully be employed both when a network is first constructed on a small scale and later expanded, or when the network is initially constructed in its full size. The addressing scheme can, perhaps, be best understood when employed in a network that starts with two column loops and at each enlargement, two additional column loops are added (to insure the scheme of alternating directions of signal flow) between each pair of existing column loops. Thus, the initial two column loops are labeled 0 and 1, and the first level of added column loops are labeled as fractions uniformly distant between the existing loop, two column loops between 0 and 1 labeled $\frac{1}{3}$ and $\frac{2}{3}$, and two column loops between 1 and 0 labeled $1\frac{1}{3}$ and $1\frac{2}{3}$. Extending to additional levels, an address can be represented as positional number $N = k t_1 t_2 t_3 \ldots t_n$, where k takes the value 0 or 1 and the $t_i$'s, each representing another level, take the value 1 or 2; i.e., $$N = a + \sum_{i=0}^{n} t_i \left(\frac{1}{3}\right)^i.$$

In accordance with the above equation, N is constrained to be less than 2. Because of this modulo 2 range, it is very easy to determine the quadrant of a source node relative to a destination node: a simple subtraction, modulo 2, yields the required decision by merely observing whether the subtraction result is greater or less than 1.

Thus, this addressing technique offers the advantage of simplicity in calculating quadrants as well as simplicity in assigning new addresses without the need to reassign the addresses of existing nodes.

As indicated earlier, the network of FIG. 1 is constrained only in that it expects an even number of row loops and column loops. This does not mean, however, that each row loop and/or column loop must be fully populated, in the sense that all like loops must have the same number of nodes. Hence, this requirement is not a true constraint because, in accordance with my invention as described below, any number of nodes may conveniently be added.

Figure 6:
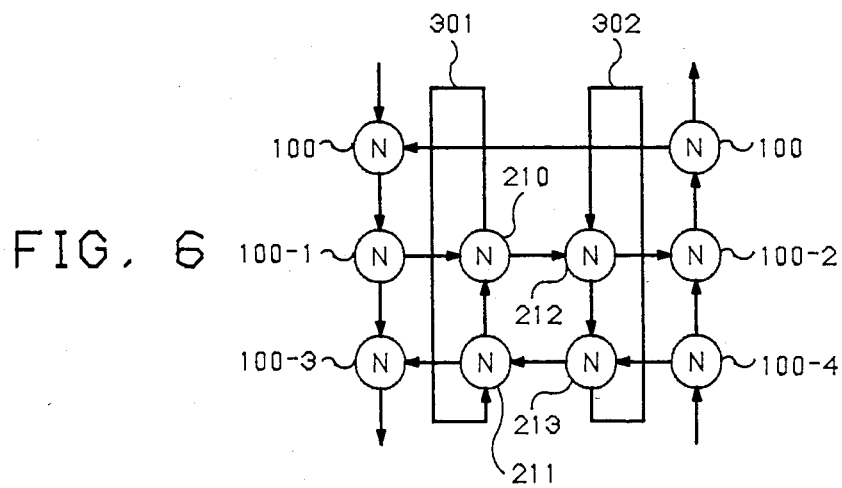
FIGS. 6-11 illustrate various interconnection patterns for connecting a small number of additional nodes to the network of FIG. 1.
Figure 7:
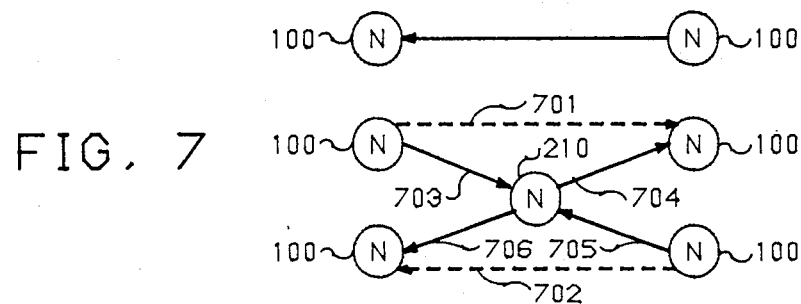

Clearly, one can add two columns to the network of FIG. 1 and insert no nodes at the intersections of the newly added columns with the existing rows. One can also insert only one node in one of the newly added columns and have the single node form a column loop of only one node. This arrangement, however, is not too interesting since the node's outgoing link is connected to its own incoming link. This is overcome, however, when two degenerative versions of node 100 are introduced, as shown in FIG. 6. In FIG. 6, the network of FIG. 1 is shown with four nodes interposed between nodes 100-1, 100-2, 100-3, and 100-4, and those four nodes are the only members of column loops 301 and 302. Nodes 210 and 211 comprise column loop 301 and nodes 212 and 213 comprise column loop 302. Acceptance of one conventional node 210 (i.e., identical in structure to nodes 100) is accomplished with two degenerative nodes of type A (nodes 212 and 213), and with one degenerative node of type B (node 211). A type A degenerative node is simply a through connection from one incoming link to one outgoing link. A type B degenerative node is two through connections of the type A variety. Of course, type A and type B degenerative nodes can merge in the link connections between nodes 100 and 210, resulting in a structure like the one shown in FIG. 7. For purposes of describing the network, however, it is convenient to maintain the concept of degenerative nodes as described above. In FIG. 7, dotted links 701 and 702 represent the original interconnection links but, in order to accommodate node 210, link 701 is broken to form a link pair 703 and 704 that encompasses node 210, and link 702 is broken to form a link pair 705 and 706 that also encompasses node 210.

Figure 8:
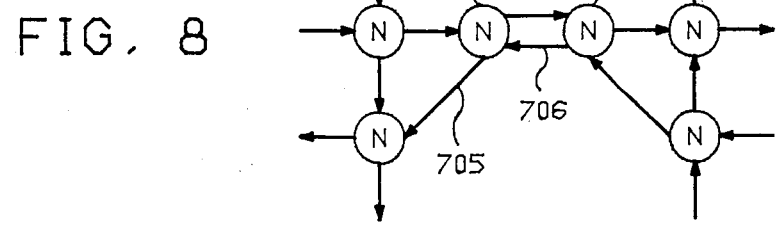
Figure 9:
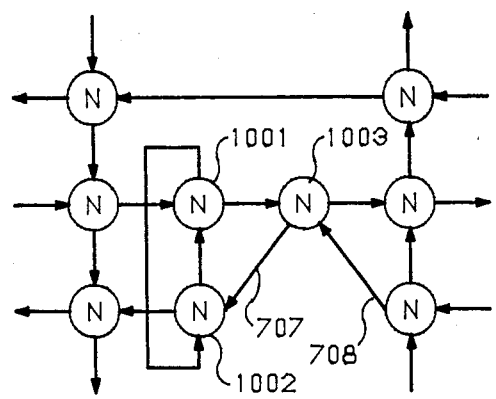
Figure 10:
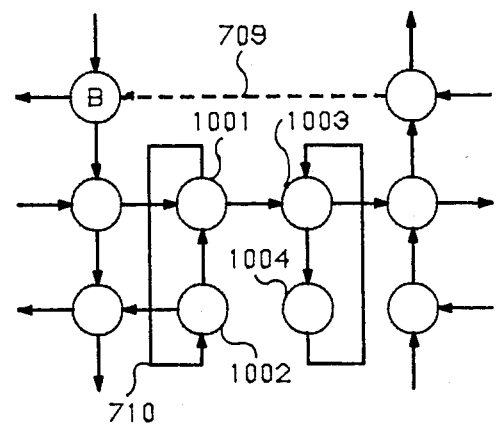
Figure 11:
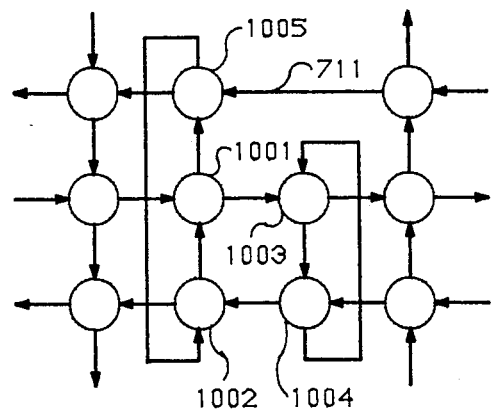

Similarly with respect to the addition of two or three nodes, an interconnection employing the degenerative nodes that merge with the links connecting the nondegenerative nodes yields FIG. 8 which illustrates the interconnection pattern for adding two nodes and FIG. 9 illustrates the interconnection pattern for the addition of three nodes. FIG. 10 depicts the interconnection pattern for the addition of four nodes which is, perhaps, the expectd pattern, and FIG. 11 depicts the interconnection pattern for the addition of five nodes.

The above-outlined procedure has the characteristic that only two existing links must be changed to add a new node, and new nodes are two-connected and will survive single failures. Also, new nodes can be added in any order, not just the order shown in FIGS. 6–11, although an effort should be made to keep the network as regular as possible. When this procedure is followed, two complete rows or columns are eventually added to the network.

Figure 12:
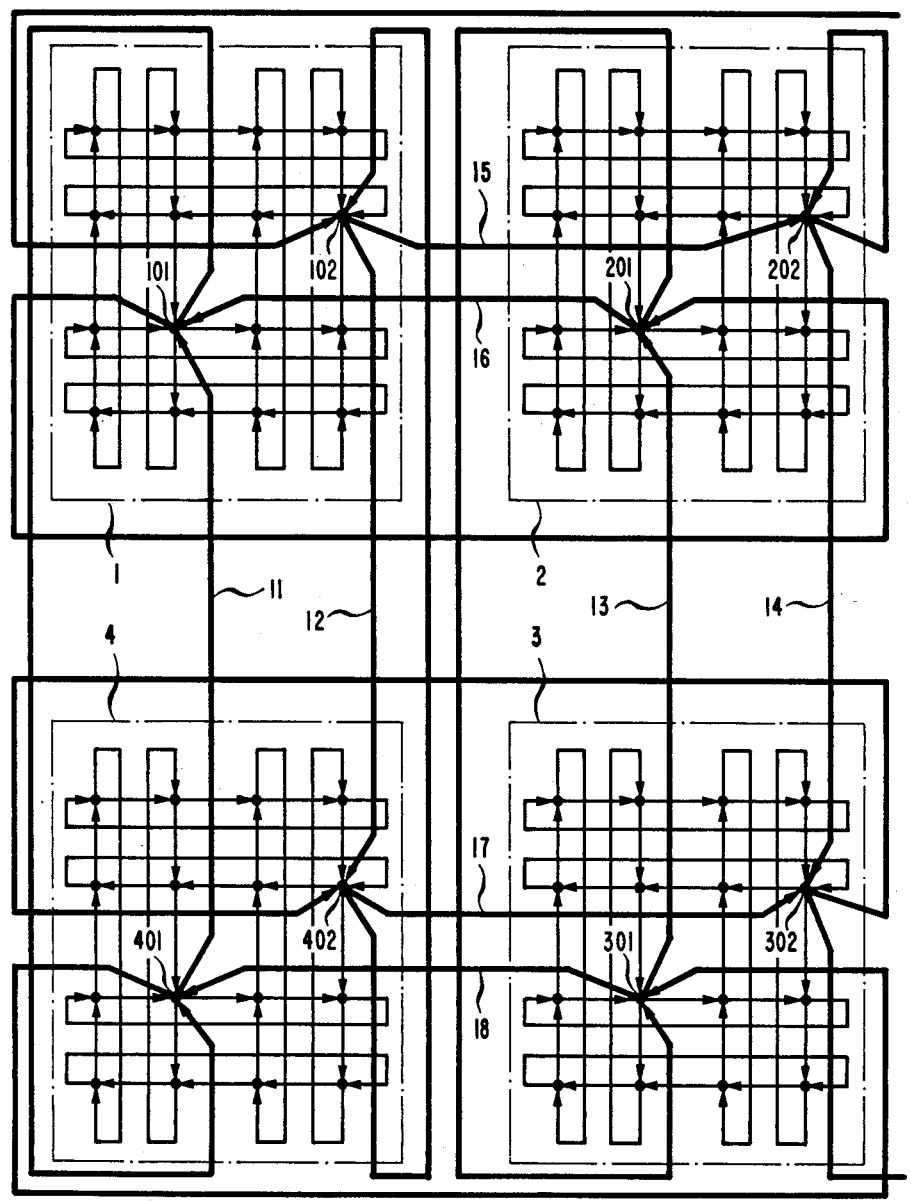
FIG. 12 illustrates a hierarchical arrangement of a network following the principles of my invention.

The above describes a means for enlarging the network of FIG. 1 by the addition of nodes in the network. Another approach for enlarging the user community is to interconnect a plurality of FIG. 1 networks. Such interconnections create hierarchical structures. Hierarchical structures are useful in this network in that they decrease the number of long paths between physically distant communities of interest, and they prevent traffic between nodes in one community of interest from affecting communication between nodes in another community of interest. One way to form such hierarchical structures, shown in FIG. 12, is to connect one or more of the nodes in a local network to a higher level network. In the system shown in FIG. 12, this is done by linking nodes from four separate networks (1, 2, 3 and 4) together. The higher level network consists of transfer nodes 1010 and 1020 in network 1, nodes 2010 and 2020 in network 2, nodes 3010 and 3020 in network 3, and nodes 4010 and 4020 in network 4 joined by vertical links 11, 12, 13 and 14 and horizontal links 15, 16, 17 and 18. Note that the number of incoming links and the number of outgoing links are still equal in each transfer node. The transfer nodes are structured like the other nodes (e.g., as shown in FIG. 5) except that their switch 120 includes two more inputs and two more outputs, from which and to which signals are routed. The routing algorithm remains essentially unchanged. Using this approach, a hierarchical addressing and routing structure is easily employed. To wit, the address field in each packet is made to include an "area code" subfield, and when the area code in that subfield of a packet is different from the area code of the network where the packet is located, then the packet is routed to one of the transfer nodes in the network where it is cast upon the higher level network comprising links 11–18. When the packet reaches its desired network, the associated transfer node routes it to inside the network, where it proceeds to seek its destination node.

Viewed alternatively, the FIG. 1 network might in fact represent a network at the highest hierarchical level, where each node 100 serves as a "regular" node in the FIG. 1 network and some or all also serve as transfer nodes between the network of FIG. 1 and networks below network 1 (in hierarchical order). The transfer may occur via the port reserved for device 230 or via a third input/output pair.

Each lower level network is also of the type shown in FIG. 1, with one or more nodes serving as transfer points to the higher level network. This structure can be pushed down further by selectig some, or most of the nodes in the second level network as transfer points to a third level network. An arrangement akin to country code-national area code-exchange-telepone number can easily be accomplished.

What is claimed is:

1. A communication network having a plurality of nodes, each adapted for coupling a device to said network and having a first and second incoming link and a first and second outgoing link, with said plurality of nodes being approximately equally divided among a plurality of row groups and also approximately equally divided among a plurality of row groups and also approximately equally divided among a plurality of column groups, each of said nodes thereby belonging to a row group and to a column group, charcterized by:

each of said nodes, belonging to a particular row group and a particular column group has its first outgoing link connected to a first incoming link of another one of said nodes belonging to said particular row group, and has its second outgoing link connected to a second incoming link of another one of said nodes belonging to said particular column group; and each of said row groups and each of said column groups are interconnected with only one of said nodes;

where a first node, belonging to a first row group and to a first column group, has its first outgoing link connected to a first incoming link of a second node in said first row group;

said second node, belonging to said first row group and to a second column group, has its second outgoing link connected to a second incoming link of a third node in said second column;

said third node, belonging to said second column group and to a second row group, has its first outgoing link connectd to a first incoming link of a fourth node in said second row group; and said fourth node, belonging to said second row group and said first column group, has its second outgoing link connected to the second incoming link of said first node.

2. The network of claim 1 wherein each of said nodes further comprises:

an input port and an output port adapted for connection to said device, a switch means for communicating signals between said first and second incoming links and said first and second outgoing links, means for communicating signals to and from said device via said input and output ports, a first delaying means on said first incoming link for delaying signals arriving on said first incoming link, a second delaying means on said second incoming link for delaying signals arriving on said second incoming link, and means for controlling said switch means and said first and second delaying means to synchronize the arrival of signals at said switch means and to route said signals through said switch means.

3. The network of claim 2 wherein each of said nodes further comprises:

a first holding means on said first outgoing link for holding packets waiting to be transmitted on said first outgoing link, and a second holding means on said second outgoing link for holding packets waiting to be transmitted on said second outgoing link.

4. The network of claim 2 further comprising third delaying means on said input port for delaying signals arriving from said device.

5. A communication network having a plurality of nodes, each adapted for coupling a device to said network and having a first and second incoming link and a first and second outgoing link, with said plurality of nodes being approximately equally divided among a plurality of row groups and also approximately equally divided among a plurality of column groups, each of said nodes thereby belonging to a row group and to a column group, characterized by:

each of said nodes, belonging to a particular row group and a particular column group has its first outgoing link connected to a first incoming link of another one of said nodes belonging to said particular row group and has its second outgoing link connected to a second incoming link of another one of said nodes belonging to said particular column group; and each of said row groups and each of said column groups are interconnected with only one of said nodes;

where the majority of said nodes are interconnected with a first node, belonging to a first row group and to a first column group, having its first outgoing link connected to a first incoming link of a second node in said first row group;

said second node, belonging to said first row group and to a second column group, having its second outgoing link connected to a second incoming link of a third node in said second column;

said third node, belonging to said second column group and to a second row group, having its first outgoing link connected a first incoming link of a fourth node in said second row group; and said fourth node, belonging to said second row group and said first column group, having its second outgoing link connected to the second incoming link of said first node.

6. A local area communications network having a plurality of nodes arranged in row loops and column loops, each of said nodes belonging to one particular row loop and to one particular column loop and adapted for connecting a device to said network, the structure and connectivity of each of said nodes being characterized by:

a first outgoing link, capable of transferring signals only out of said node, connected to a first connectively adjacent one of said nodes in said particular row loop, a second outgoing link, capable of transferring signals only out of said node, connected to a second connectively adjacent one of said nodes in said particular column loop, a first incoming link, capable of transferring signals only into said node, connected to a third connectively adjacent one of said nodes in said particular row loop, and a second incoming link, capable of transferring signals only into said node, connected to a fourth connectively adjacent one of said nodes in said particular column loop;

with said connectivity arranged for connecting each of said row loops with each of said column loops with only one of said nodes.

7. A communication network having a plurality of nodes, each adapted for coupling a device to said network and having a first and second incoming link and a first and second outgoing link, with said plurality of nodes being approximately equally divided among a plurality of row groups and also approximately equally divided among a plurality of column groups, each of said nodes thereby belonging to a row group and to a column group, characterized by:

each of said nodes, belonging to a particular row group and a particular column group has its first outgoing link connected to a first incoming link of another one of said nodes belonging to said particular row group, and has its second outgoing link connected to a second incoming link of another one of said nodes belonging to said particular column group;

said network adapted for carrying signal packets that include a destination address for said packets, wherein each of said nodes is identified by an absolute node address, each of said nodes includes control means for routing signal packets flowing into said node to said first or second outgoing links, and said control means in each of said nodes executes a routing decision for each pair of incoming packets to be routed to said first and second outgoing links in accordance with:

a first step of developing for each incoming packet of said pair of incoming packets a relative address of said node that is related to the absolute address of said node and the destination address of said incoming packet;

a second step of evaluating a preferred outgoing link choice for each incoming packet of said pair of incoming packets;

a third step of comparing said preferred outgoing link choices developed by said second step;

a fourth step of resolving conflicts when, in accordance with said third step, it is determined that the preferred outgoing link choice is the same for both of said packets in said pair of incoming packets; and a fifth step of routing said pair of incoming packets to said outgoing links in accordance with the resolutions of said fourth step.

8. The network of claim 7 wherein said second step is evaluated in accordance with the odd/even status of the absolute address of the node performing said record step and in accordance with the odd/even status of said destination address. The network of claim 7 wherein second step comprises, for each packet in said pair of incomig packets, the steps of:

(i) dividing said network into a plurality of sections arranged around the destination node of said packet, (ii) determining the section in which said destination node resides, and (iii) determining, based on the absolute address of said destination node, said preferred output link choice for said packet.

9. The network of claim 7 wherein second step comprises, for each packet in said pair of incoming packets, the steps of:

(i) dividing said network into a plurality of sections arranged around the destination node of said packet, (ii) determining the section in which said destination node resides, and (iii) determining, based on the absolute address of said destination node, said preferred output link choice for said packet.

10. The network of claim 9 wherein said nodes are adapted for interfacing signal devices to said network via an incoming device link and an outgoing device link.

11. The network of claim 9 wherein some of said nodes are degenerative nodes, performing the sole function of permanently connecting one or both of their incoming links to one or both of their outgoing links, respectively.

12. The network of claim 9 wherein some of said nodes are degenerative nodes, performing the sole function of permanently connecting its incoming row link to its outgoing column link and connecting its incoming column link to its outgoing row link.

13. The network of claim 9 wherein some of said nodes are degenerative nodes, performing the sole function of permanently connecting its incoming row link to its outgoing row link and connecting its incoming column link to its outgoing column link.

14. The network of claim 9 wherein said nodes are adapted for interfacing with a lower level communication network via an incoming lower level network link and an outgoing lower level network link, wherein said lower level network comprises:

interconnected lower level nodes arranged in lower level row loops and column loops, characterized by:

each of said lower level nodes having a lower level row incoming link and a lower level row outgoing link as well as a lower level column incoming link and a lower level column outgoing link, and said lower level nodes being adapted for switching signals arriving on said lower level incomings links to said lower level outgoing links;

each of said lower level nodes belonging to a lower level row loop and to a lower level column loop and having a lower level address designation corresponding to a lower level column number and a lower level row number;

a lower level row loop, having an address with a first even/odd sense, being formed by connecting the outgoing link of each lower level node belonging to said lower level row loop and having a particular lower level column address to the incoming link of another lower level node in said lower level row loop having the next higher lower level column address, and connecting the outgoing link of the lower level node in said lower level row loop having the highest lower level column address to the incoming link of the lower level node in said lower level row loop having the lowest lower level column address;

a lower level row loop, having an address with an even/odd sense opposite from said first even/odd sense, being formed by connecting the outgoing link of each lower level node belonging to said lower level row loop and having a particular lower level column address to the incoming link of another lower level node in said lower level row loop having the next lower lower level column address, and connecting the outgoing link of the lower level node in said lower level row loop having the lowest lower level column address to the incoming link of the lower level node in said lower level row loop having the highest lower level column address;

a lower level column loop, having an address with a second even/odd sense, being formed by connecting the outgoing link of each lower level node belonging to said lower level column loop and having a particular lower level row address to the incoming link of another lower level node in said lower level column loop having the next higher lower level row address, and connecting the incoming link of the lower level node in said lower level column loop having the highest lower level row address to the lower level node in said lower level column loop having the lowest lower level row address; and a lower level column loop, having an address with an even/odd sense oppostie from said second even/odd sense, being formed by connecting the outgoing link of each lower level node belonging to said lower level column loop and having a particular lower level row address to the incoming link of another lower level node in said lower level column loop having the next lower lower level row address, and connecting the outgoing link of the lower level node in said lower level column loop having the lowest lower level row address to the incoming link of the lower level node in said lower level column loop having the highest lower level row address.

15. A communications network having interconnected nodes arranged in row loops and column loops, characterized by:

each of said nodes having a row incoming link and a row outgoing link as well as a column incoming link and a column outgoing link, and said nodes being adapted for switching signals arriving on said incoming links to said outgoing links;

each of said nodes belonging to a row loop and to a column loop and having an address designation corresponding to a column number and a row number;

a row loop, having an address with a first even/odd sense, being formed by connecting the outgoing link of each node belonging to said row loop and having a particular column address to the incoming link of another node in said row loop having the next higher column address, and connecting the outgoing link of the node in said row loop having the highest column address to the incoming link of the node in said row loop having the lowest column address;

a row loop, having an address with an even/odd sense opposite from said first even/odd sense, being formed by connecting the outgoing link of each node belonging to said row loop and having a particular column address to the incoming link of another node in said row loop having the next lower column address, and connecting the outgoing link of the node in said row loop having the lowest column address to the incoming link of the node in said row loop having the highest column address;

a column loop, having an address with a second even/odd sense, being formed by connecting the outgoing link of each node belonging to said column loop and having a particular row address to the incoming link of another node in said column loop having the next higher row address, and connecting the incoming link of the node in said column loop having the highest row address to the node in said column loop having the lowest row address; and a column loop, having an address with an even/odd sense opposite from said second even/odd sense, being formed by connecting the outgoing link of each node belonging to said column loop and having a particular row address to the incoming link of another node in said column loop having the next lower row address, and connecting the outgoing link of the node in said column loop having the lowest row address to the incoming link of the node in said column loop having the highest row address.

* * * * *